Oct. 2, 1923.
A. J. GOSSELIN
BROILER
Filed Dec. 24, 1921
1,469,508
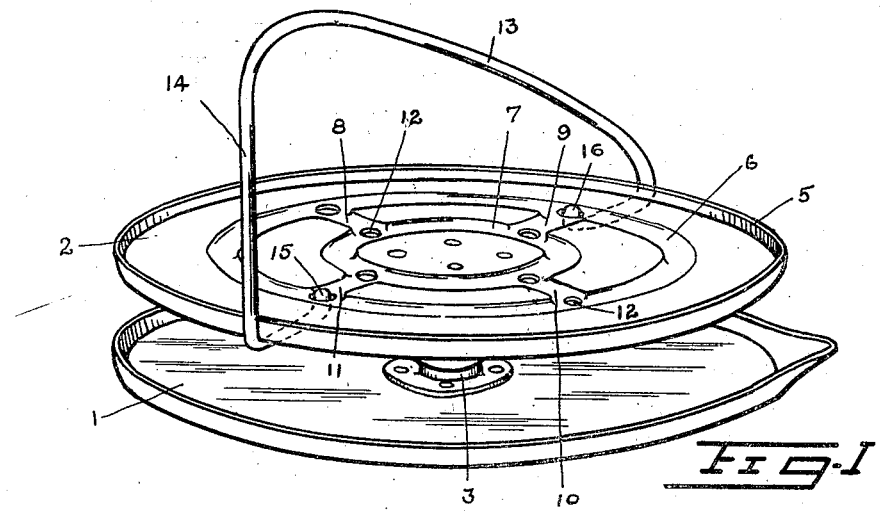
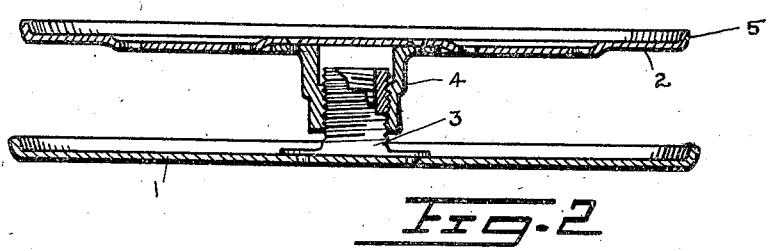
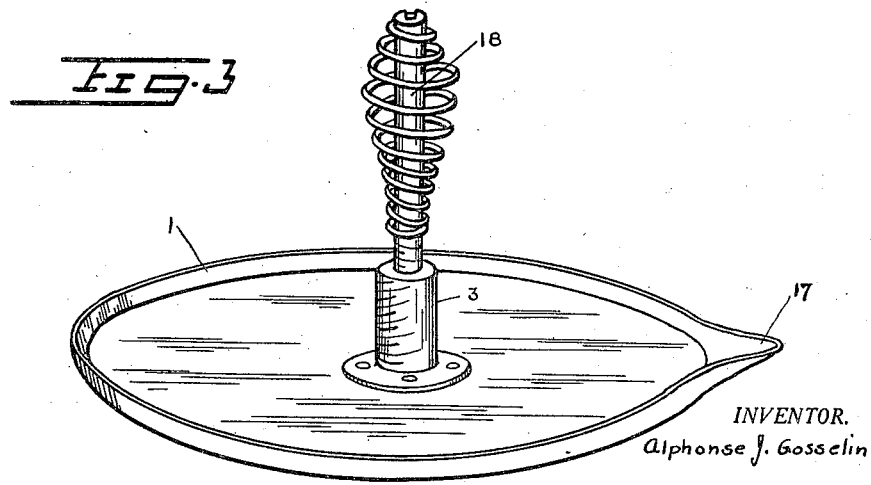
INVENTOR.
Alphonse J. Gosselin
Frank Keiper
ATTORNEYS.

Patented Oct. 2, 1923.

1,469,508

UNITED STATES PATENT OFFICE.

ALPHONSE J. GOSSELIN, OF ROCHESTER, NEW YORK.

BROILER.

Application filed December 24, 1921. Serial No. 524,711.

*To all whom it may concern:*

Be it known that I, ALPHONSE J. GOSSELIN, a citizen of the United States, residing at Rochester, in the county of Monroe and State of New York, have invented certain new and useful Improvements in Broilers, of which the following is a specification.

The object of this invention is to provide a new and improved type of broiler for broiling or roasting meat in an oven.

Another object of the invention is to make the broiler in two separable parts so that one of them can be used as a griddle for making pan cakes, etc.

These and other objects of this invention will be fully illustrated in the drawing, described in the specification and pointed out in the claims at the end thereof.

In the accompanying drawing:

Figure 1 is a perspective view of the broiler.

Figure 2 is a vertical sectional view of the broiler, the section being taken on the line 2×—2× of Figure 1.

Figure 3 is a detail perspective view of the dripping pan of the broiler as it will appear when used as a griddle for making pan cakes, etc.

In the several figures of the drawing like reference numerals indicate like parts.

In broilers the main object is to support and present the meat to the flame so that it broils evenly and with as little loss of the meat juices as is possible. For this purpose it is desirable to first hold the meat in close proximity of the flame of the fire to quickly and evenly sear the meat and then lower the meat away from the flame to finish the broiling of the meat slowly and evenly to get the best results. To do this it is advantageous when the meat can be moved away from the flame in a horizontal plane into a less intensely heated spot of the oven in order to prevent one part of the meat from searing or broiling to a greater extent than any other part thereof.

The broiler forming the subject matter of my present invention is made up of the dripping pan 1 and the broiling pan 2. For the purpose of supporting the broiling pan above the dripping pan, the latter is provided with the threaded stem 3 which is mounted centrally of the pan and is riveted thereto in any suitable manner. The broiling pan in turn is provided with a threaded socket 4 into which the stem 3 is threaded. The threaded engagement of the stem 3 with the socket 4 provides a vertical adjustment between the dripping pan and the broiling pan which takes place when the broiling pan is revolved over the dripping pan. During the rotation of the broiling pan in either the one or the other direction the socket 4 thereof is screwed either up or down on the stem 3 of the dripping pan and when placed in the oven the broiling pan moves either toward or away from the flame of the burner under which it is located during this operation.

The broiling pan 2 and the dripping pan are preferably made up in the form of sheet metal stampings to which the socket 4 and stem 3 are suitably riveted as heretofore pointed out. The broiling pan has a short flange 5 formed thereon which encircles the edge of the pan and slightly projects above the face thereof. On the face of the pan are also formed the concentric channels 6 and 7 which are connected with each other by the radial channels 8, 9, 10 and 11. At the junction of each of the radial channels with the concentric channel a hole 12 is punched into the pan. A series of eight holes are thus provided in the channels through which the meat juices collected by them are allowed to drip down into the dripping pan.

To handle the broiler a handle 13 is provided. This handle is in the form of an irregular shaped bail as shown in perspective in Figure 1. This bail has the vertical straight section 14 formed at one side of the bail while the remainder of the bail is curved down toward the other end thereof. Each end of the bail is turned inwardly with the short upwardly projecting extensions 15 and 16 formed thereon. These extensions are adapted to project into a pair of the holes provided in the broiling pan from the under side thereof and when engaged in these holes in this manner the broiler will balance on the bail.

For the purpose of placing the broiler into the oven, the broiler is handled by taking hold of the straight vertical side of the bail in the manner in which an ordinary pan having a handle on one side is placed therein. After the broiler is placed in the oven, the bail is disengaged from the broiling pan by lowering the handle so that the upturned extensions 15 and 16 disengage themselves from the holes in the pan and allow the lower ends of the bail to be withdrawn from under the pan. This operation is reversed when the bail is to be attached to take the broiler out of the oven.

In using the broiler to broil meat, the meat is placed on top of the broiling pan. The broiling pan is then elevated by revolving it until the meat has been brought as close to the flame as is desirable. The meat can then be seared evenly by turning the pan so that the heat from the burner is directed to all parts thereof with the same intensity. After this is done the pan may be lowered by revolving the broiling pan in the opposite direction until a point is reached where the heat from the burner operates to slowly finish the broiling of the meat.

During the broiling of the meat, the meat juices which escape from the meat are collected in the concentric and radial channels and drip into the lower or dripping pan 1. The drippings collected in this pan are used to make the gravy and when the broiler is taken from the oven the dripping pan is tilted by means of the handle 13 and the meat juices are poured out of the spout 17 formed thereon.

By making the upper or broiling pan solid with the exceptions of the dripping holes punched therein, this pan completely covers the lower or dripping pan. This construction of the pan eliminates the danger of having the drippings collected in the dripping pan catch fire from the burners as the broiling pan is always placed between the flame of the burner and the dripping pan.

For the purpose of using the lower pan as a griddle, a handle 18 is threaded into the center of the stem 3. This handle is preferably made in the form of a wire handle as shown in Figure 3 so that the griddle formed in this manner can be easily handled without danger of getting burned.

I claim:

1. In a roaster, the combination of a dripping pan, a roasting pan supported above said dripping pan, means for simultaneously rotating and raising said roasting pan above said dripping pan.

2. In a roaster, the combination of a dripping pan, a roasting pan mounted above said dripping pan, means interposed between said dripping pan and said roasting pan to raise said roasting pan from said dripping pan on the rotation of said roasting pan.

3. In a roaster, the combination of a dripping pan, a threaded stem mounted centrally of said dripping pan, a roasting pan, a threaded socket mounted centrally of the bottom of said roasting pan, said threaded stem being adapted to engage into said threaded socket and adjustably support said roasting pan above said dripping pan.

4. In a roaster, the combination of a dripping pan, a roasting pan detachably mounted above said dripping pan, a detachable handle adapted to engage the underside of said roasting pan for the purpose of suspending said roasting pan and dripping pan therefrom.

5. In a roaster, the combination of a dripping pan, and a roasting pan, said dripping pan being detachable from said roasting pan, a handle adapted to be attached to the center of said dripping pan for the purpose of transforming said dripping pan into a griddle.

6. In a roaster, the combination of a dripping pan, a roasting pan adjustable vertically and rotatably above said dripping pan, said roasting pan having holes therein, a bail having means provided thereon to engage into the holes in said roasting pan from the under side thereof.

7. In a roaster, the combination of a dripping pan, a roasting pan, means for simultaneously raising or lowering said roasting pan with relation to said dripping pan, said roasting pan having a solid bottom provided with a series of holes, channels formed in said bottom connecting the holes provided therein, said roasting pan forming a fire guard between the flame of the burner and the dripping pan.

In testimony whereof I affix my signature.

ALPHONSE J. GOSSELIN.